US005365923A

United States Patent [19]

Lundberg

[11] Patent Number: 5,365,923

[45] Date of Patent: Nov. 22, 1994

[54] SOUND RESPONSIVE OPTICAL WARNING APPARATUS AND METHOD FOR SCBA

[76] Inventor: Mats E. Lundberg, Jupiternagen 29, 181 63 Lidingo, Sweden

[21] Appl. No.: 79,283

[22] Filed: Jun. 21, 1993

[30] Foreign Application Priority Data

Dec. 29, 1992 [SE] Sweden ........................ 9203931

[51] Int. Cl.[5] .................... A62B 7/00; A62B 9/00; H04B 13/02; G08B 5/22

[52] U.S. Cl. .................... 128/205.23; 128/202.22; 340/815.46; 340/850

[58] Field of Search .................. 128/202.22, 204.18, 128/204.22, 205.22, 205.23, 205.25; 340/815.46, 825.77, 289, 326, 850

[56] References Cited

U.S. PATENT DOCUMENTS

| | | | |
|---|---|---|---|
| 3,092,104 | 6/1963 | Cassidy | 128/202.22 |
| 3,106,205 | 10/1963 | Caldwell | 128/202.22 |
| 3,111,946 | 11/1963 | Galeazzi | 128/202.22 |
| 3,252,458 | 5/1966 | Krasberg | 128/202.22 |
| 4,237,449 | 12/1980 | Zibell | 340/407 |
| 4,365,238 | 12/1982 | Kollin | 340/521 |
| 4,800,373 | 1/1989 | Mayz | 340/626 |
| 4,803,471 | 2/1989 | Rowland | 340/626 |
| 4,949,072 | 8/1990 | Comerford et al. | 128/201.19 |
| 4,999,606 | 3/1991 | Comerford et al. | 128/201.19 |
| 5,045,833 | 9/1991 | Smith | 340/332 |
| 5,191,317 | 3/1993 | Toth et al. | 128/205.23 |

FOREIGN PATENT DOCUMENTS

| | | | |
|---|---|---|---|
| 0371761 | 6/1990 | European Pat. Off. | |
| 3440215 | 5/1986 | Germany | 128/202.22 |
| 2220574 | 1/1990 | United Kingdom | |

*Primary Examiner*—Kimberly L. Asher

*Attorney, Agent, or Firm*—Pollock, Vande Sande & Priddy

[57] ABSTRACT

A method and an apparatus are provided for optically indicating that the gas pressure of a gas reservoir of a gas mask worn by a user has reached a predetermined value. This value is indicated by an acoustic signal within a predetermined frequency range and at a given lowest sound level. The method is characterized by monitoring for sound within the predetermined frequency range and above the lowest sound level with the aid of a sound detecting device, and activating a light source in response to such sound detected by the device. The apparatus includes a device for delivering an acoustic signal within a predetermined frequency range and at a sound level which exceeds a predetermined lowest value, a sound detecting unit which actively monitors for the sound within the predetermined frequency range and at the sound level exceeding the lowest value, and a light source which is connected to the sound detecting unit for producing a light warning signal.

12 Claims, 2 Drawing Sheets

SOUND RESPONSIVE OPTICAL WARNING APPARATUS AND METHOD FOR SCBA

FIELD OF THE INVENTION

The present invention relates to a method of producing an optical indication that the gas pressure in a gas reservoir connected to a consumer has reached a predetermined value, this pressure value being indicated by an acoustic signal within a predetermined frequency range and at a given sound level. The present invention also relates to a device for optically indicating that the gas pressure of a consumer-connected gas reservoir has reached a predetermined value.

BACKGROUND OF THE INVENTION

According to current standards applied in many countries with regard to breathing apparatus intended for use in contaminated environments and in fire environments, such apparatus is required to be provided with a suitable warning device which will warn the wearer of the apparatus that the pressure in the gas reservoir has reached a predetermined value.

For instance, in current European standards for bodycarried breathing apparatus operating with compressed air, the aforesaid predetermined pressure level is given as 50 to 60 bars or when at least 200 liters free inhalation gas remains in the gas bottle or gas reservoir. Other pressure values apply in U.S. standards (U.S.A.) for instance. The majority of commercially available breathing apparatus of the kind intended here are provided with an acoustic warning device which, at the applicable predetermined warning pressure, activates a whistle which is operated by the gas from the gas reservoir.

Different standards specify the frequency and sound level of the acoustic warning signal produced.

Since it is possible that the person wearing the breathing apparatus is located in a high sound level environment and may, in certain cases, wear a head guard, such as a helmet and/or a protective hood which restricts the ability of the wearer to hear the acoustic warning signal, or the hearing of the wearer may be impaired, it is possible that the wearer will fail to hear the acoustic warning. When the person concerned is working in a contaminated environment or a fire environment, his/her failure to hear the acoustic warning may prevent the person from stopping work in time to ensure a safe return. Conversely, the aforesaid person may misinterpret some other sound, such as an acoustic fire warning signal, and prematurely interrupt a life-saving operation in the belief that the acoustic warning of his/her breathing apparatus has been activated.

The present invention can also be applied to pneumatically operated systems in general, where a predetermined pressure is indicated by an acoustic signal.

SUMMARY OF THE INVENTION

The object of the present invention is to provide a complement to the acoustic warning given by the breathing apparatus with the intention of increasing the certainty of identifying the warning signal produced.

In accordance with the present invention, this object is achieved with a method which is characterized by continuously monitoring for sound that lies within the given frequency range and is louder than the aforesaid lowest sound level with the aid of an active or passive sound detecting device, and activating a light source in response to detection of such sound. The object is also achieved with a device which is characterized by a sound detecting unit which actively or passively monitors sound within the given frequency and with the sound level exceeding the lowest value, and a light source which is connected to the sound detecting unit.

BRIEF DESCRIPTION OF THE DRAWINGS

The present invention will now be described in more detail with reference to the accompanying drawing.

DETAILED DESCRIPTION OF THE PREFERRED EMBODIMENT

Figure 1:
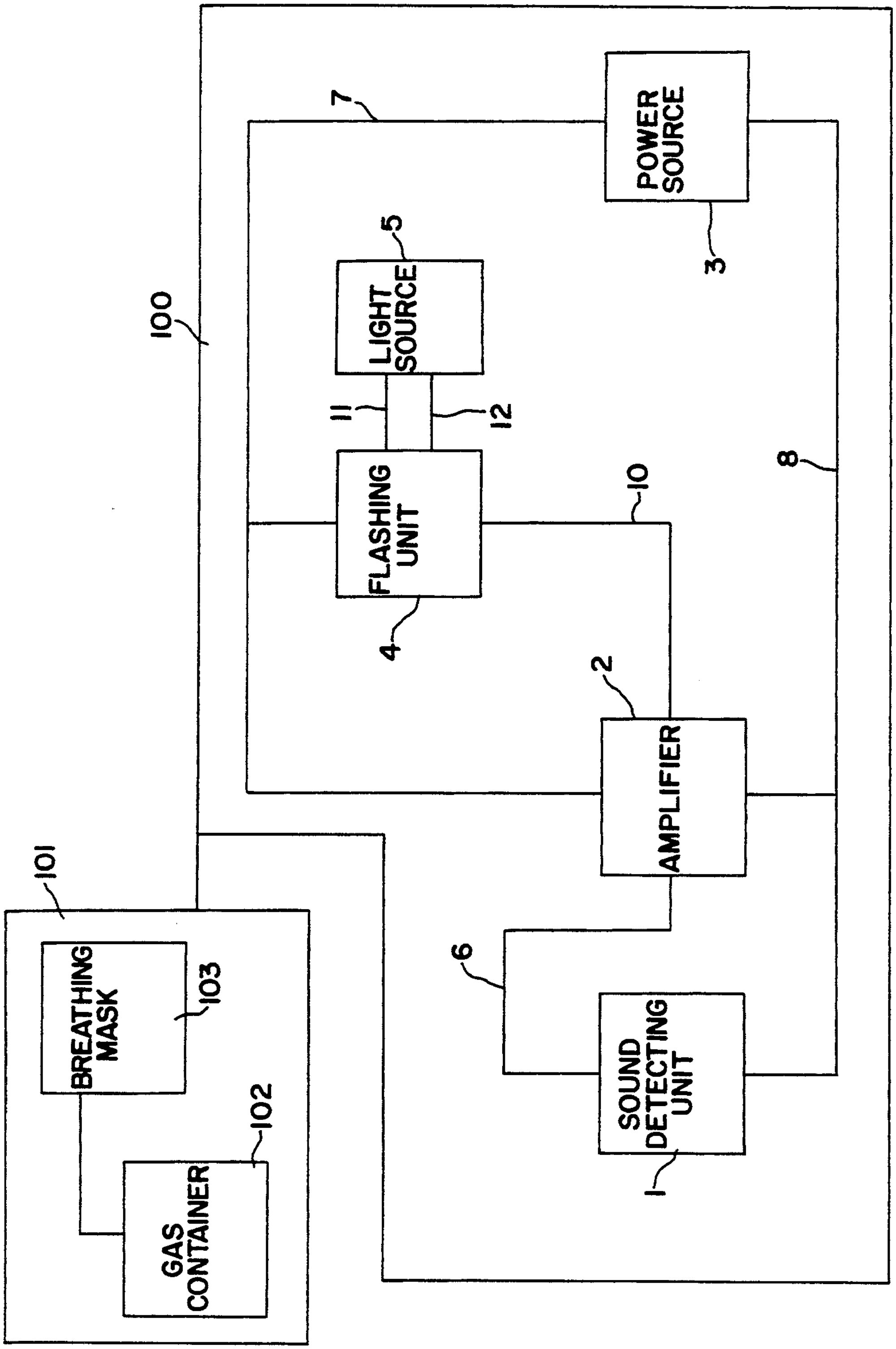
FIG. 1 represents a block schematic illustrating the principles of an inventive optical warning system.
Figure 2:
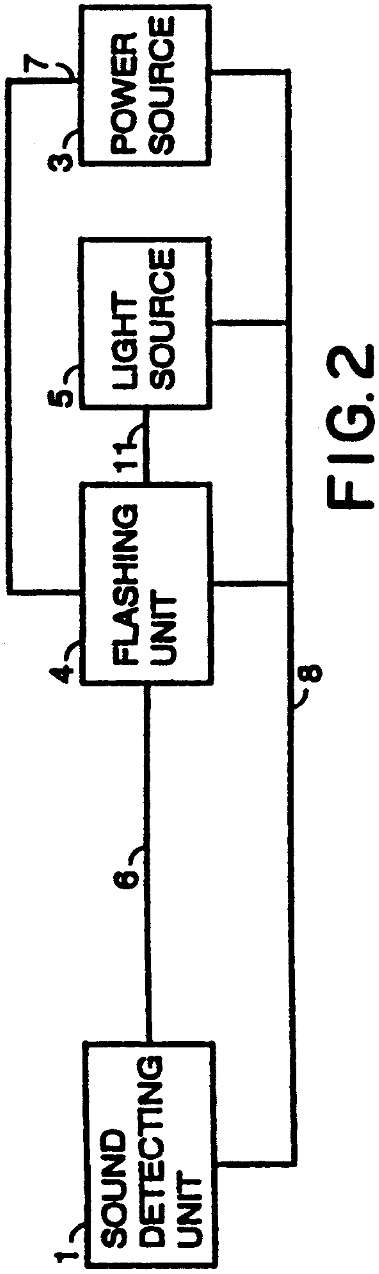
FIG. 2 represents a block schematic illustrating another embodiment of the present invention in which the sound detecting device is connected directly to a flashing unit directly rather than to an operational amplifier.
Figure 3:
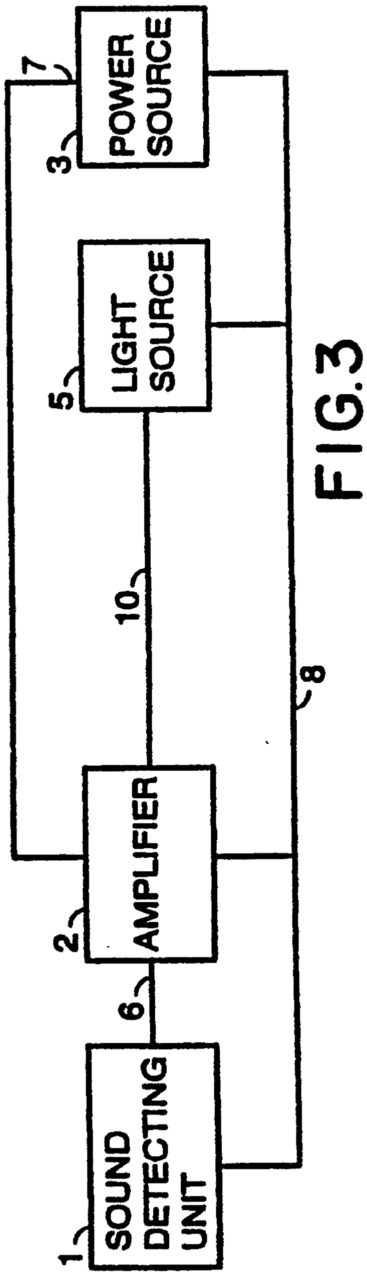
FIG. 3 represents a block schematic illustrating a further embodiment of the present invention in which an operational amplifier is connected directly to light source and a flashing unit is not included.

When the acoustic warning apparatus 100 produces an acoustic signal, there is activated at the same time a light source to produce an optical signal which indicates to the wearer of the self-contained breathing apparatus 101 that the acoustic warning signal has been detected by his/her apparatus and which also constitutes an optical complement to the acoustic system thereby increasing the certainty of the warning being noticed in a highly noisy environment in which there is a risk that the person carrying the apparatus will not hear the acoustic signal.

In order to activate the optical signal and the acoustic warning precisely at one and the same time, there is used a sound detecting device, for example, a piezo electric crystal, which monitors sound actively or passively on the sound signal frequency and at the sound level applicable.

The self-contained breathing apparatus 101 includes a gas container or reservoir 102 and a breathing mask 103. When the pressure in a gas reservoir 102 has fallen to the aforesaid predetermined level at which the warning signal shall be activated, the acoustic device will produce an acoustic signal within a predetermined frequency range, for example, 2,000–4,000 Hertz, and at a sound intensity which exceeds a predetermined strength.

According to the present invention, a sound detecting device 1 is placed adjacent the source of the acoustic signal. The device 1 is connected by a line 6 to an operational amplifier 2, or may be connected directly to a flashing unit 4 by means of a line 10. A voltage U is applied across the operational amplifier 2, which amplifies the signal from the sound detecting device, this voltage being produced by a power source 3, for example, a battery. The operational amplifier 2 is connected to the power source 3 by means of lines 7 and 8. The signal produced by the operational amplifier 2 is delivered to a flashing unit 4, for instance an IC-circuit, along a line 10. The flashing unit 4 is connected to a light source 5 by means of lines 11 and 12. The light source 5 is, for instance, a light-emitting diode (LED).

According to one embodiment of the present invention, the operational amplifier 2 may be connected directly to the light source 5 by lines 10, 12 and the light source 5 connected to the power source 3 by the lines 7, 11. The flashing unit 4 is omitted in this embodiment.

An acoustic signal is produced when the pressure in the gas bottle has fallen to a predetermined value at which a warning shall be sounded. The described electronic device which monitors either actively or passively, for the presence of sound from the gas reservoir detects the acoustic signal and, in response thereto, the sound detecting device activates an operational amplifier (OP) which in turn activates the light source. When the operational amplifier is permitted to open a flashing circuit, the light source, for example, a light-emitting diode, can be caused to produce an optical, flashing signal. In other cases a fixed light is obtained.

The electronics are suitably embodied together with a power source in an explosion-proof housing which is screened against external sound sources by partially surrounding the acoustic warning apparatus.

Suitable sound frequency and sound level are determined when constructing the warning device.

The light source 5 for producing optical warning signal is positioned where it can be seen by the wearer of the apparatus and also preferably where it can be seen by other people that may be present nearby. When the warning system is used together with protective equipment, the light source is preferably mounted in the visor of the protective mask worn by the person wearing the apparatus.

The present invention is not limited to the exact details shown here and above for obvious modifications will occur to persons skilled in the art.

I claim:

1. A warning apparatus in combination with a self-contained breathing apparatus comprising a container for storing a breathing gas under pressure and a breathing mask connected to the container and adapted to be worn by the user the warning apparatus comprising:

means responsive to sensing a predetermined low value of gas pressure in the container for generating an audible alarm signal having predetermined frequency characteristics and a predetermined minimum amplitude only when the gas pressure reaches said predetermined low level; and means for visually signalling to the user of the warning apparatus and also to other persons who are within visual range of the user that the gas pressure in the container has reached such predetermined low level, said visual signaling means comprising:

a. means for continuously monitoring said audible alarm signal;

b. means for generating a light signal at a location visible to at least the user only in response to said audible alarm signal having said predetermined frequency characteristics and an amplitude at least as great as said predetermined minimum amplitude; and means for controlling said light signal and for generating said light signal only when said audible alarm signal is present to thereby provide assurance that said light signal is a valid indication of the occurrence of low pressure in said container.

2. An apparatus according to claim 1, wherein said light signal is an intermittently shining light.

3. An apparatus according to claim 1, wherein said light signal is a continuously shining light.

4. An apparatus according to claim 1, wherein a light source for generating said light signal is a light-emitting diode (LED).

5. An apparatus according to claim 4, wherein said sound monitoring means is a piezo electric crystal.

6. An apparatus according to claim 5, further including an operational amplifier mounted between the sound monitoring means and said light source.

7. An apparatus according to claim 4, further including means for causing said light source to produce intermittently flashing light, said means for causing flashing light comprising a flashing unit.

8. A method of visually signalling to a user of a self-contained breathing apparatus having a container of gas and to other persons who are within visual range of the user that the gas pressure in the gas container has reached a predetermined low level, said method comprising the steps of:

providing a self-contained breathing apparatus having a container for storing a breathing gas under pressure, a breathing mask connected to the container and adapted to be worn by a user, and means responsive to a gas pressure in the container of a predetermined low value for generating an audible alarm signal of predetermined frequency and low amplitude characteristics;

generating said audible alarm signal responsive to detecting said predetermined low pressure value in said container;

providing a sound monitoring means for continuously monitoring for said audible alarm signal; and generating a light signal at a location visible to the user and to other persons within visual range of the user only in response to said audible alarm signal having said predetermined frequency characteristics and an amplitude at least equal to said predetermined low amplitude.

9. A method according to claim 8, further comprising the step of providing a light source for generating said light signal, said light source comprising a light-emitting diode (LED).

10. A method according to claim 9, wherein said sound monitoring means is a piezo electric crystal.

11. A method according to claim 10, further comprising the step of including an operational amplifier mounted between the sound monitoring means and said light source.

12. A method according to claim 8, further comprising the step of using a piezo electric crystal for said sound monitoring means.

* * * * *